UNITED STATES PATENT OFFICE.

ALFRED SEŸBERLICH AND ALEXANDER TRAMPEDACH, OF RIGA, RUSSIA.

MANUFACTURE OF GLUCOSE.

SPECIFICATION forming part of Letters Patent No. 337,448, dated March 9, 1886.

Application filed July 21, 1885. Serial No. 172,237. (No specimens.) Patented in Belgium June 11, 1885, No. 69,236; in France June 11, 1885, No. 169,505; in England July 1, 1885, No. 8,000; in Luxemburg July 1, 1885, No. 552, and in Austria-Hungary August 11, 1885, No. 24,527 and No. 42,956.

*To all whom it may concern:*

Be it known that we, ALFRED SEŸBERLICH, a subject of the King of Prussia, residing at Riga, Russia, and ALEXANDER TRAMPEDACH, a subject of the Emperor of Russia, residing at Riga, Russia, have invented certain new and useful Improvements in the Manufacture of Glucose; and we do hereby declare the following to be a full, clear, and exact description of the invention, such as will enable others skilled in the art to which it appertains to make and use the same.

This invention relates to the manufacture of crystallized grape-sugar. The present process differs from those heretofore in use, in that the employment of alcohol, bone-charcoal, or permanganate of potash for the purification, clearing, and discoloration of the liquid grape-sugar is rendered unnecessary. The said invention, however, exhibits several new features, of which the following may be especially mentioned: First, the saccharification of the starch by the exclusive use of diluted nitric acid, and, second, the alkalization of the sugar-liquor prior to the inspissation in a vacuum by means of carbonate of soda.

In the conversion of starch into sugar by means of diluted sulphuric acid a small quantity of nitric acid has heretofore been used in order to accelerate the saccharification. The use of pure nitric acid has, however, not been possible in the processes hitherto adopted, for the reason that the product obtained invariably contains considerable quantities of sirup, together with the soluble substances contained in the sirup, and consequently the salts produced in the neutralization, when nitric acid is used, impart to the product such a strong saline taste as to render the sugar unfit for consumption. The use of nitric acid is therefore only admissible when the sirup is completely separated. This separation is attained by the second part of the process. Hitherto only such a small quantity of an alkali has been added to the sugar-juices that it was scarcely sufficient for the neutralization of the acids. We have found, however, that the sugar separates by crystallization much more completely from alkaline solutions than from only neutral or perhaps partially-acid solutions. The sugar separates from the latter only in fine needles, which unite and inclose a large quantity of sirup which cannot be removed by centrifugal action. This defect is removed by the improved process. Trials have shown that the starch or grape-sugar separates from alkaline solutions not in fine needles, but in plain strong crystals of a distinctly individual character, so that under centrifugal action the sirup is very easily and completely separated from the pure sugar. This process consequently enables the use of pure nitric acid for the saccharification of the starch.

The manufacture of grape-sugar according to this invention is as follows—that is to say: Air-dried starch is mixed with water to form a milk, and into the latter is slowly introduced boiling diluted nitric acid in the proportion of two to ten kilograms of nitric acid to one thousand kilograms of starch. The proportion of the starch to the entire quantity of the water can be from one-third to one-half. The mixture is next boiled in a wooden, stone, or other suitable vessel upon which the nitric acid does not exert an action injurious to the product. These vessels can, if desired, be provided with cooling appliances. The conversion into sugar is very complete, and in the progress of the saccharification alcohol may be caused to react upon the substance. The boiling must be continued until ten drops of the sugar-liquor do not cause dimness in twenty cubic centimeters of alcohol of ninety-six per cent. The acid of the thin juice is then neutralized by chalk, limestone, dolomite, or similarly-acting substances, and is next brought, by means of a caustic alkali, or the carbonate of an alkali or an alkaline earth in excess, to a distinctly alkaline reaction. The thin juice, the reaction of which is thoroughly alkaline, is inspissated in a vacuum to from 33° to 36° Baumé, (specific weight 1.2943 to 1.3311,) and is then left to crystallize. From this distinctly alkaline sugar-liquor the sugar separates in single cyrstals which do not contain any portions of sirup worth mentioning, so that the latter can be perfectly and easily separated by centrifugal action. The new process differs in this respect essentially from those heretofore used. To the liquors of sugar have hitherto been added only slight quantities of an alkali which were scarcely sufficient for effecting the neutralization. From such partially-acid liquors the sugar separates by crystallization in small needles which combine together, thus forming a close net-work inclosing a considerable quantity of sirup, which cannot be removed by centrifugal action and materially injures the quality of the sugar by its bad taste. The sirup is separated from the crystal mass by centrifugal force, or in any other suitable manner, and the remaining grape-sugar crystals, which are destitute of water, furnish, after cleansing, a commercial product containing from ninety-six to ninety-eight per cent. of sugar. The sirup flowing off is sometimes evaporated and left to crystallize. The sirup which does not not crystallize is mixed with sulphuric acid, so that the nitrate of lime contained in the said sirup is converted into sulphate of lime and free nitric acid. This sirup is freed from the sulphate of lime by pressure, and as it contains the greatest portion of the nitric acid originally employed it is used in the next operation.

In every boiling operation it is necessary to add sufficient nitric acid to make up for waste.

This process of neutralizing the sugar-liquors can also be advantageously employed in the known processes of saccharification by means of sulphuric acid under pressure; but then peroxide of hydrogen or some other suitable oxidizing medium must be added to the liquor, which is alkaline, in order to oxidize the glutinous substances arising from the albuminous portions of the starch in the boiling with sulphuric acid, as the said substances would otherwise render the crystallization of the sugar difficult, or prevent part of the latter altogether from crystallizing.

As already stated, according to this process a product is obtained which consists of single crystals containing from ninety-six to ninety-eight per cent. of sugar.

What we claim as new is—

1. In the manufacture of grape-sugar, the saccharification of the starch by diluted nitric acid and the regeneration of the remaining sirup containing nitric acid combinations, using the remaining nitric acid by adding sulphuric acid thereto.

2. In the manufacture of grape-sugar, obtaining solutions of starch-sugar by means of nitric and sulphuric acids, or combinations of such, and treating said starch-sugar with caustic or carbonaceous alkalies or alkaline earths in quantity, in order to obtain an alkaline sugary solution in which the sugar-crystals are easily and completely separated by centrifugal action.

In testimony whereof we affix our signatures in presence of two witnesses.

ALFRED SEYBERLICH.
ALEXANDER TRAMPEDACH.

Witnesses:
ALEX. KRÖGER,
ADOLF RICHTER.